United States Patent [19]
Menzin et al.

[11] 3,941,440
[45] Mar. 2, 1976

[54] SELF-LEVELING DISPENSER

[75] Inventors: Marvin Menzin, Lexington; Hugh A. Robinson, Wenham, both of Mass.

[73] Assignee: Peters and Company, Inc., Dorchester, Mass.

[22] Filed: Sept. 17, 1974

[21] Appl. No.: 506,930

Related U.S. Application Data

[63] Continuation of Ser. No. 379,347, July 16, 1973, abandoned.

[52] U.S. Cl. ............... 312/71; 108/136; 211/49 D; 221/232
[51] Int. Cl.² .... A47B 9/02; A47F 1/04; B65H 1/20
[58] Field of Search ...................... 312/71, 312, 319; 211/49 D; 108/136, 37, 147; 220/93; 221/226, 232

[56] References Cited
UNITED STATES PATENTS

| | | | |
|---|---|---|---|
| 2,707,142 | 4/1955 | Waite | 312/71 |
| 2,896,790 | 7/1959 | Bell et al. | 312/71 X |
| 2,919,168 | 12/1959 | Shivek | 312/71 |
| 2,932,403 | 4/1960 | Vershbow | 211/49 D |
| 2,932,404 | 4/1960 | Vershbow | 211/49 D |
| 2,934,211 | 4/1960 | Shivek | 211/49 D |
| 3,694,044 | 9/1972 | Cummings | 312/71 |
| 3,722,970 | 3/1973 | Healy | 312/71 |
| 3,820,478 | 6/1974 | Bergenthal | 108/136 |

FOREIGN PATENTS OR APPLICATIONS

| | | | |
|---|---|---|---|
| 1,429,534 | 9/1964 | Germany | 108/147 |

*Primary Examiner*—Paul R. Gilliam
*Assistant Examiner*—Carl F. Pietruszka

[57] ABSTRACT

Self-leveling dispenser of the type having an elongated lever which serves to balance the spring and platform, with a member being adjustable along the lever for altering the ratio of effective moment arms to change the effective spring rating of the dispenser. An adjustment feature comprises felxible strands connected to opposite sides of the adjustable member. By means of a pulley surface, both strands leave the lever at the pivot point and proceed to a take-up pay-out device, shown as a dentent-controlled reel. For avoiding working against the spring during adjustment the lever concavely curves about the line of action of a tension spring acting upon the lever. In combination of these features the strands are guided by longitudinally convex surfaces of the curved member. The platform and spring loads are shown to act in one diagonal direction of a rectangular frame with the frame braced by a tension member extending in the opposite diagonal direction.

17 Claims, 7 Drawing Figures

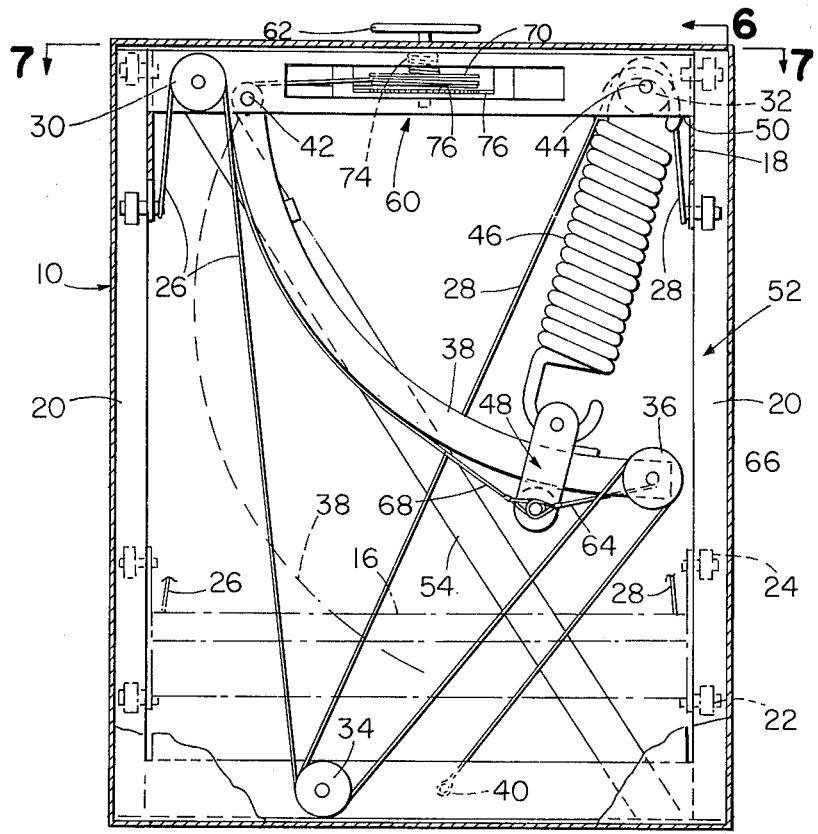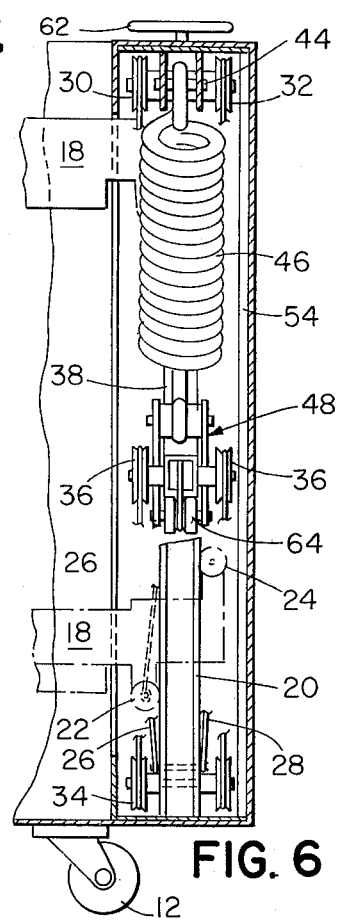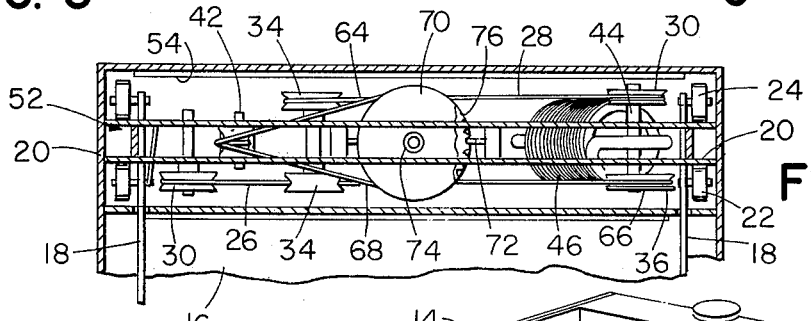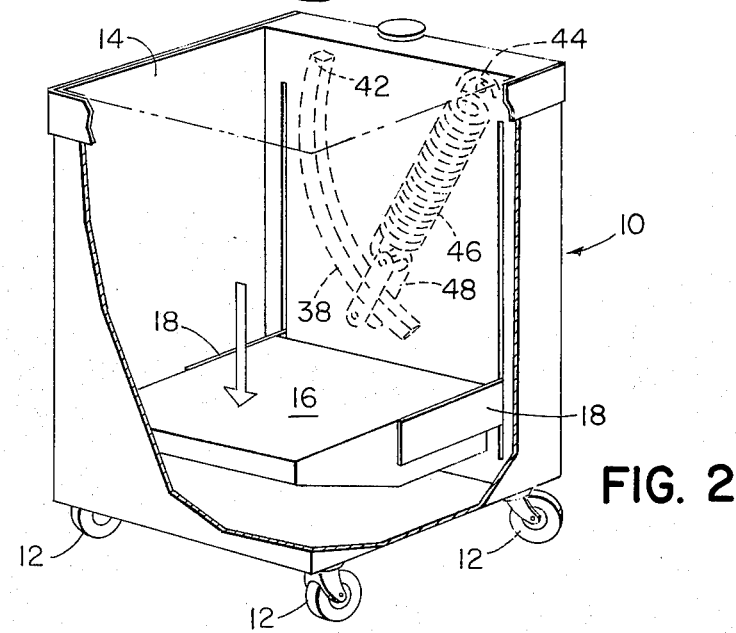

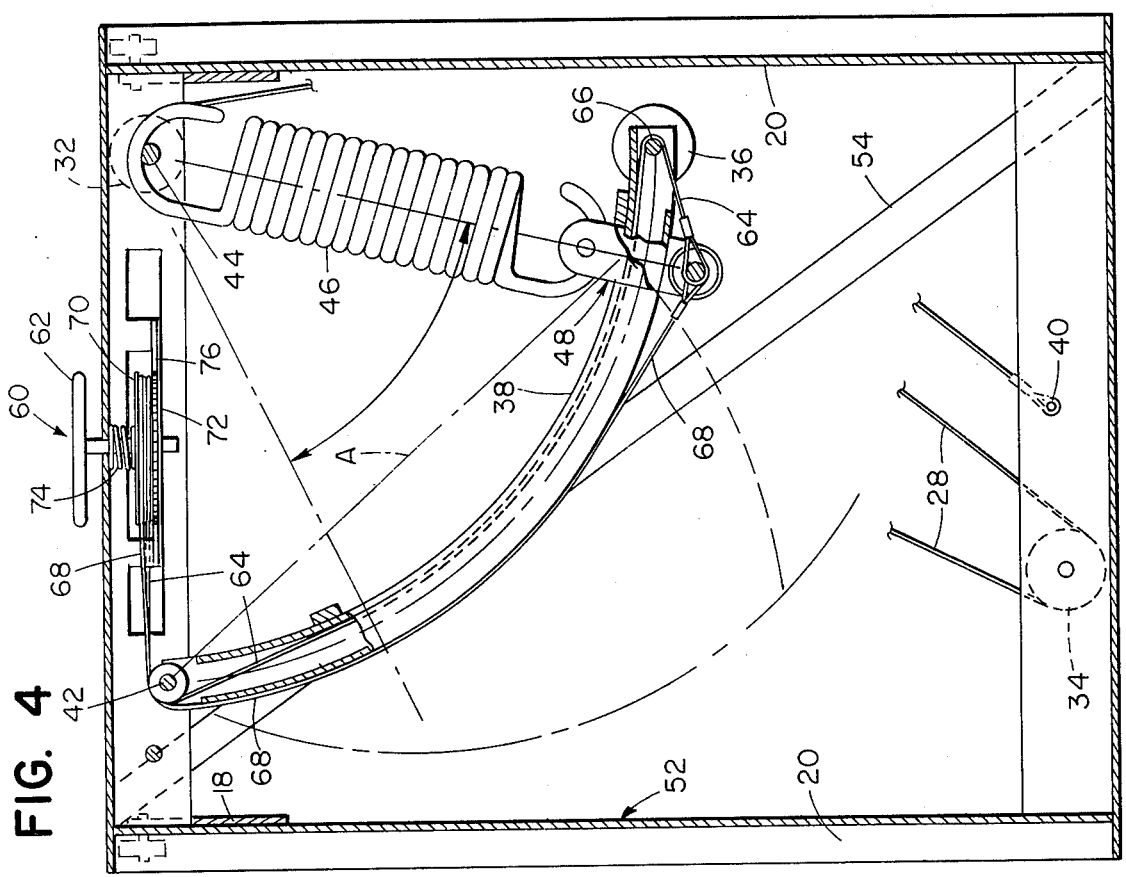
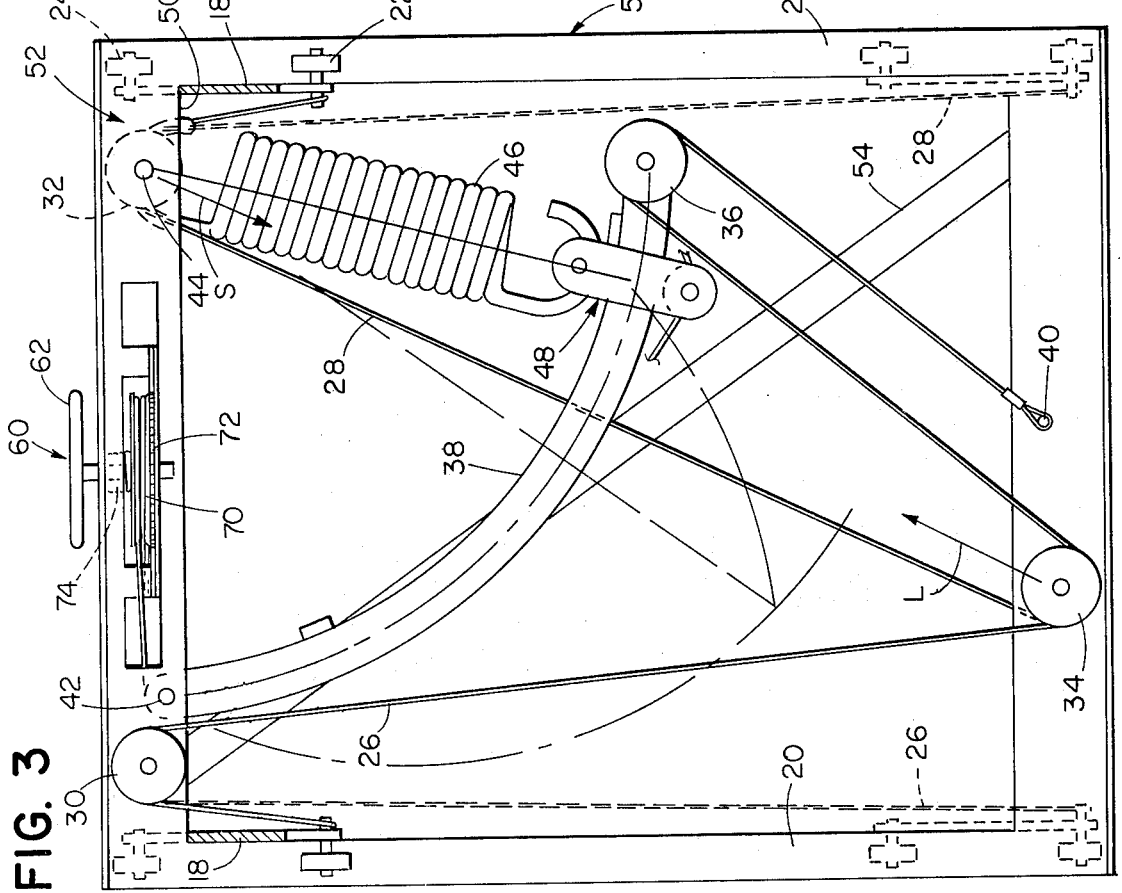

SELF-LEVELING DISPENSER

This is a continuation of application Ser. No. 379,347, filed July 16, 1973, now abandoned.

This invention concerns self-leveling dispensers for presenting workpieces such as dishware to a user at a convenient height. In particular the invention concerns a dispenser intended for stacks of pieces of various selected weights.

The general object of the invention is to improve dispensers of the known type having an elevator platform for a stack of pieces to be dispensed, a suspension system for the platform and an adjustable spring system connected through the suspension system to the platform to progressively raise the platform as the load on the platform decreases. By means of an elongated lever and an adjustable point for the pivot or either load point of this type of dispenser, the ratio of moment arms is variable for balancing the selected platform load against the spring load.

Particular objects of the invention are to provide such a dispenser which is more economical to construct and convenient to adjust than those heretofore known.

According to one aspect of the invention, an adjustment device is provided comprising flexible strands acting in opposite directions upon that member which is to be moved along the lever. At least one of the strands turns back about a pulley surface mounted on the lever and both of the strands leave the lever in the vicinity of the lever pivot and extend to a take-up payout device. This device is effective to pay out one while taking up the other of the strands, thus to position the member along the lever as desired. A locking device locks the positions of the strands and of the member when the desired position is achieved.

In preferred embodiments according to this aspect of the invention: the lever is curved to eliminate or reduce lever travel during movement of the member; where the member to be moved is the connector for a tension spring, this curved portion of the lever is concave about the line of action of the tension spring; and preferably the tension spring is connected directly at one end to a connector on the lever and at the opposite end directly to a pivot on stationary structure of the dispenser, with the lever curved concentrically about the pivot of the spring in a given position of the lever. It is also preferred that the lever be pivoted at one end, the suspension system connector be fixed at the opposite end of the connector, and the spring be movable over an intermediate portion of the lever; that the lever be concavely curved throughout its entire effective length and be a hollow tube convex surfaces of which the strands slide; and that the curve of the lever be concentric about the point from which the spring acts when the elevator is in its uppermost position. It is also preferred that the take-up pay-out device by a reel having a detent and that the two be normally biased together to prevent movement except when the operator overcomes the bias and that the spring and lever system impose a first diagonal tension force which is diagonally braced simply by a single diagonal tension member.

In the drawings:

FIG. 2 is a perspective view partially broken away of the dispenser of FIG. 1 incorporating the preferred embodiment of the invention;

Figure 1:
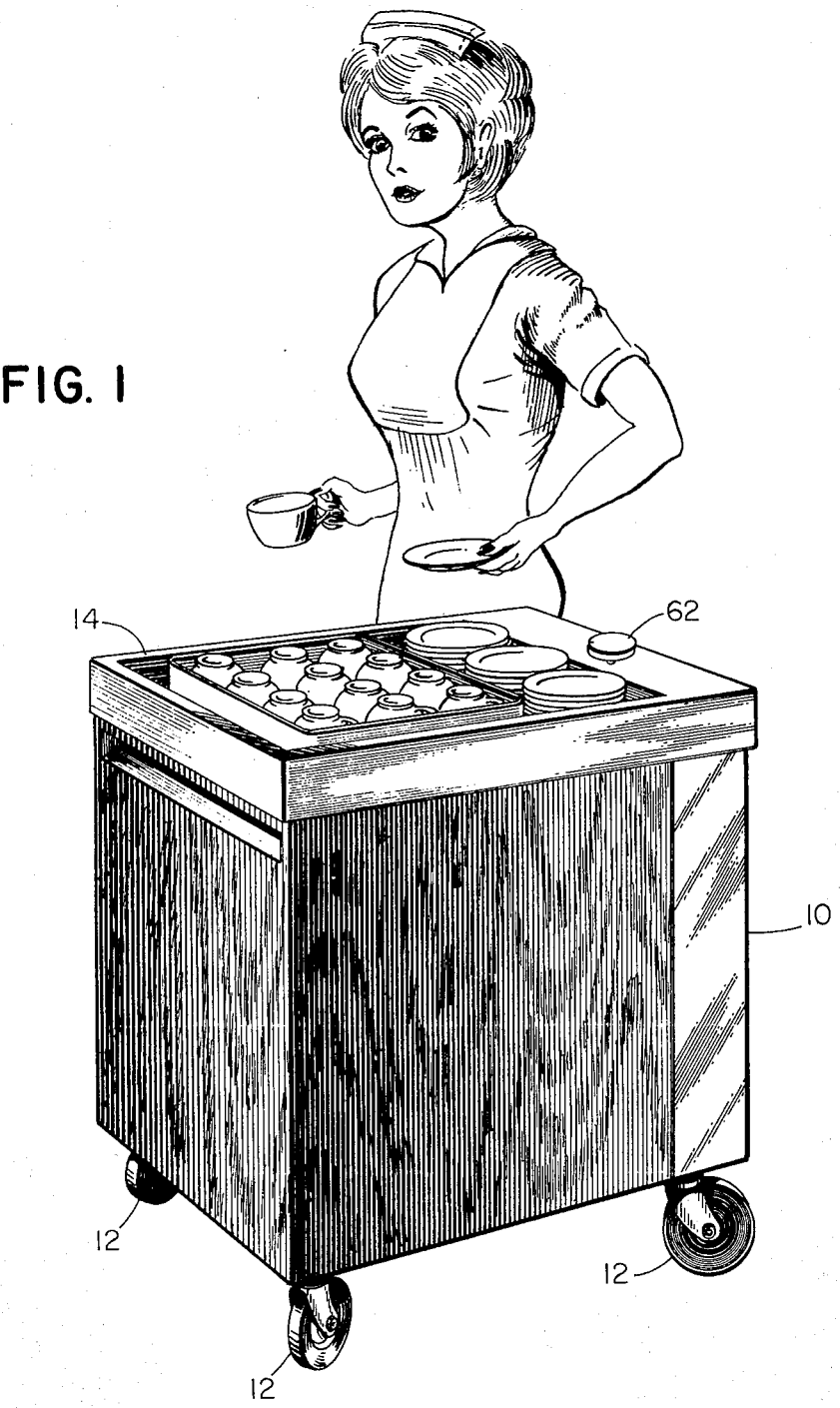
FIG. 1 is a perspective view of a self-leveling dispenser of the type here involved used in dispensing foodservice ware.

FIGS. 3, 4 (with parts broken away), and 5 (full) are vertical cross-sectional views of the dispenser of FIG. 2, revealing the adjustment mechanism shown in dotted lines of FIG. 2;

FIG. 6 is a side cross-sectional view taken on line 6—6 of FIG. 5; and

FIG. 7 is a plan view taken on line 7—7 of FIG. 5.

Referring to FIGS. 1 and 2, the dispenser according to the preferred embodiment of the invention comprises a stationary structure including housing 10 mounted on casters 12 and defining a top opening 14 from which workpieces may be removed, the stack of workpieces resting upon elevator platform 16. The platform is supported at its two sides by arms 18 guided on rails 20 by means of rollers 22 and 24. The arms 18 are suspended by cables 26 and 28 which are part of a flexible suspension system. The cables extend respectively about pulley surfaces 30 and 32 at the top of the dispenser thence downwardly to pulleys 34 at the bottom of the dispenser and thence to pulleys 36 at the free end of lever 38 and thence back downwardly to ground point 40. The elongated lever 38 is pivoted at its other end at 42 at the top left of the dispenser as viewed in FIGS. 3–5. At the right hand of the top of the dispenser in FIG. 5 is a pivotal spring ground point 44, from which extends tension spring 46 to connector 48 on the lever. As shown in FIGS. 3 and 5, the elevator is in its upward stopped position defined by stops 50. The lever 38 comprises a circular arc of curvature corresponding to the distance from spring ground point 44 to lever pivot 42 and thus in the up position the curvature of lever 38 is centered upon spring ground point 44. In the mid-position generally the loads of the adjustment system on the stationary structure are represented by arrow L representing the platform load and S the spring load, thus imposing a general diagonal tension load acting between the lower left and upper right quadrants of the rectangular frame 52 as viewed in FIG. 3. A diagonal tension member 54 extending between the opposite two quadrants, upper left and lower right, and secured at opposite ends to the frame, braces the rectangular structure 52 against these loads.

A hand operable take-up pay-out device 60 including knob 62 is positioned at the top of the dispenser, and is operable to move the spring connector 48 throughout the adjustment range along lever 38. This is accomplished by means of two flexible strands operating in opposite directions upon the spring connector 48. The first strand 64, secured to the spring connector 48, extends outwardly from the connector to pulley surface 66 thence inwardly to the vicinity of the pivot 42 of the lever thence to one side of the take-up pay-out device 60. The second strand 68 is secured to the spring connector 48 and extends directly to the region of the pivot 42 thence to the other side of the take-up pay-out device.

More particularly, the arm 38 is provided in the form of a tube of square cross section bent in a tube-bending machine to have the desired curvature. The strand 64 extends about pulley surface 66 thence throughout the interior of the tube, bearing slidably upon the convex, longitudinal inner surface of the tube as it proceeds to pivot 42. The second strand 68 extends along the exterior of the tube, slidably engaging the longitudinal convex surface of the tube. Both strands 64 and 68 are of flexible steel cable provided with an exterior antifriction coating. The take-up pay-out device comprises a reel 70 having one portion adapted to take up and pay out cable segment 64 and in vice-versa relation another portion to take up and pay out cable segment 68. Thus by rotation in one direction segment 68 is taken up, and segment 64 is paid out; and, referring to FIG. 4, the spring connector 48 is thereby moved to the left along the lever 38, in effect shortening the effective moment arm A of the spring, whereby a given increment of travel of the elevator platform will be accompanied by a lesser extension of the spring, thus adapting the dispensing mechanism to a load of workpieces of lesser unit weight.

The take-up reel 70 has a lower flange provided with spur gear teeth 72. A spring 74 urges the reel 70 downwardly, and in its downward stopped position the teeth 72 engage detent 76, thus preventing rotational movement of the reel in either direction. For operation of the adjustment device the operator simply pulls handle 62 upwardly against the resistance of spring 74 until the toothed flange 72 is raised above the detent 76. Thereupon the reel is free to turn in either direction as desired. Upon release of the handle 62, spring 74 immediately forces the reel 70 downwardly until the other flange 72 engages the detent 76, thus locking the reel, the flexible segments 64 and 68, and the spring connector 48 in the newly adjusted position.

It will be observed that when the elevator platform is in its upper unloaded position, having no load other than its own tare weight, adjustment of the handle 62, thus moving the spring 46 and its connector 48 throughout the full range of the arc of lever 38, is accomplished without imposing or releasing any stress on the spring 46. By slight prestressing of the spring so that in the low load position it holds the empty platform against the upper stops, the spring can be adjusted throughout its range of positions along the lever without any movement of the platform. In another form, offcenter positioning of the pivot 44 relative to the center of the arc of the lever can be employed to create a tendency for the spring connector 48 and spring to move unassisted in one direction along the lever, thus enabling a push button control or the like in one direction, with application of load to the platform to enable movement of the connector and spring in the other direction.

What is claimed is:

1. In a self-leveling dispenser of the type having stationary structure, an elevator platform for a stack of pieces to be dispensed, a suspension system for the platform, and an adjustable spring system connected through said suspension system to the platform, the spring system operable to progressively raise the platform as the platform load decreases and comprising an elongated lever rotatable about a pivot, a suspension system connector on said lever spaced at a first moment arm distance from said pivot for application of elevator platform load to said lever at an angle thereto, a spring, a spring connector on said lever spaced at a second moment arm distance from said pivot for application of spring load to said lever at an angle thereto, and an adjustment device for varying the position along said lever of at least one of said connectors or said pivot to change the ratio of said two moment arms and thereby the load rating of said dispenser, the improvement wherein first and second elongated flexible strands are secured to the member to be adjusted along said lever, and extend in opposite directions therefrom along said lever, at least one of said strands turning back about a pulley surface mounted on said lever, and both of said strands leaving said lever in the vicinity of the lever pivot point and extending to a take-up and pay-out device mounted on said stationary structure, said device being operable to take up and pay out the respective strands and vice versa, to adjust the position of said member and thereby the ratio of said moment arms, and a means to secure said strands in a selected position thereby to fix said ratio of moment arms.

2. The dispenser of claim 1 wherein said pivot is in fixed position relative to said lever and the adjustable member is a connector for one of said loads.

3. The dispenser of claim 2 wherein the lever portion corresponding to the range of adjustment movement of said connector thereon is curved to eliminate or reduce lever travel during movement of said connector through said range.

4. The dispenser of claim 3 wherein at least one of said strands slides upon a longitudinally curved surface of said lever.

5. The dispenser of claim 3 wherein said connector is the spring connector, said spring is a tension spring, and said curved portion of said lever is concave about the line of action of said tension spring.

6. The dispenser of claim 5 wherein said tension spring is connected at one end directly to said spring connector and at the opposite end directly to a pivot on said stationary structure, at a given position of said lever said portion of said lever being substantially concentric about said pivot of said spring.

7. The dispenser of claim 2 in which said lever is pivoted at one end, said suspension system connector is fixed at the opposite end of said lever and said spring connector is movable through said range along a portion of said lever between said two ends, the first of said strands extending directly to the vicinity of said pivot and the second of said strands extending outwardly along said lever to a pulley surface, thence back along said lever to said pivot.

8. The dispenser of claim 7 wherein said spring is a tension spring and said lever is concave about the line of action of said tension spring.

9. The dispenser of claim 8 wherein said lever is concavely curved throughout substantially its entire length providing an extended range of adjustment of said spring connector.

10. The dispenser of claim 8 wherein said strands slide upon longitudinally convexly curved surfaces of said lever.

11. The dispenser of claim 10 wherein the lever comprises a hollow tube, the first strand slidable upon the exterior longitudinal convex surface thereof, and the second strand slidable upon the internal longitudinal convex surface thereof.

12. The dispenser of claim 8 including a pivot from which the line of action of said tension spring acts over the range of adjustment of said system, said lever, when the elevator platform is in its uppermost position having its curved portion centered substantially about said pivot whereby, when said platform is in said position, said spring connector can be adjusted through its range with little or no change in the spring load.

13. The dispenser of claim 7 wherein said lever is pivoted from its end at the top of said stationary structure and said take-up and pay-out device is located at the top of said dispenser to receive said strands coming from said lever, said device having a rotatable handle at the top of said dispenser operable by rotation to adjustably move said connector along said lever.

14. The dispenser of claim 7 wherein said take-up and pay-out device comprises a reel, said means to secure comprises a detent against which said reel is resiliently urged, and said handle being movable axially to temporarily remove said reel from said detent thereby to permit rotary movement of said reel to accomplish said take-up pay-out function.

15. In a self-leveling dispenser of the type having stationary structure, an elevator platform for a stack of pieces to be dispensed, a suspension system for the platform, and an adjustable spring system connected through said suspension system to the platform, the spring system operable to progressively raise the platform as the platform load decreases and comprising an elongated lever rotatable about a pivot, a suspension system connector on said lever spaced at a first moment arm distance from said pivot for application of elevator platform load to said lever at an angle thereto, a spring, a spring connector to said lever spaced at a second moment arm distance from said pivot for application of spring load to said lever at an angle thereto, and an adjustment device for varying the ratio of said two moment arms and thereby the load rating of said dispenser, the improvement wherein said lever is pivoted at one end, said suspension system connector is fixed at the opposite end of said lever and said spring connector is movable through said range along a portion of said lever between said two ends, said spring being a tension spring and being connected to said spring connector from a pivot on said stationary structure and said lever being concave about said spring pivot and the line of action of said tension spring therefrom.

16. The dispenser of claim 15 wherein said tension spring is connected at one end directly to said spring connector and at the opposite end directly to said spring pivot, at a given position of said lever said portion of said lever being substantially concentric about said spring pivot.

17. In a self-leveling dispenser of the type having stationary structure, an elevator platform for a stack of pieces to be dispensed, a suspension system for the platform, and an adjustable spring system connected through said suspension system to the platform, the spring system operable to progressively raise the platform as the platform load decreases and comprising an elongated lever rotatable about a pivot, a suspension system connector on said lever spaced at a first moment arm distance from said pivot for application of elevator platform load to said lever at an angle thereto, a spring, a spring connector to said lever spaced at a second moment arm distance from said pivot for application of spring load to said lever at an angle thereto, and an adjustment device for varying the ratio of said two moment arms and thereby the load rating of said dispenser, the improvement wherein said stationary structure includes a rectangular frame, said lever is pivoted at one end in one upper quadrant of said frame, the line of action of said spring acting in tension upward outwardly toward a point located in the other upper quadrant of said frame, a load pulley for said suspension system located in the lower quadrant of said frame lying below the pivot point of said lever, strand means of said suspension system extending from said platform about said pulley, thence directly to the suspension system connector on said lever, the effective combined line of action between said pulley and said spring extending diagonally of said frame between upper and lower quadrants, and said stationary structure including a tension member secured to said frame and extending between the opposite pair of upper and lower quadrants, opposing the tendency to collapse said frame provided by said spring and platform loads.

* * * * *